US008265384B2

(12) United States Patent
Sumi

(10) Patent No.: US 8,265,384 B2
(45) Date of Patent: Sep. 11, 2012

(54) IMAGE PROCESSING DEVICE, IMAGE PROCESSING METHOD AND RECORDING MEDIUM

(75) Inventor: Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 934 days.

(21) Appl. No.: 12/339,684

(22) Filed: Dec. 19, 2008

(65) Prior Publication Data

US 2009/0180688 A1 Jul. 16, 2009

(30) Foreign Application Priority Data

Jan. 11, 2008 (JP) .................................. 2008-004628

(51) Int. Cl.
*G06K 9/00* (2006.01)
(52) U.S. Cl. ........................................................ 382/167
(58) Field of Classification Search ........................ None
See application file for complete search history.

(56) References Cited

U.S. PATENT DOCUMENTS

| | | | | |
|---|---|---|---|---|
| 5,214,518 | A * | 5/1993 | Kato | 358/448 |
| 6,215,562 | B1 | 4/2001 | Michel et al. | |
| 6,331,042 | B1 | 12/2001 | Yamada | |
| 6,851,794 | B2 * | 2/2005 | Yamamoto | 347/43 |
| 6,876,467 | B1 * | 4/2005 | Yamaguchi | 358/1.9 |
| 7,232,200 | B2 * | 6/2007 | Nakahanada et al. | 347/19 |
| 7,301,670 | B2 * | 11/2007 | Yamano et al. | 358/1.9 |
| 7,414,751 | B2 * | 8/2008 | Yamazaki et al. | 358/1.9 |
| 7,433,096 | B2 * | 10/2008 | Chase et al. | 358/504 |
| 2002/0158933 | A1 * | 10/2002 | Yamamoto | 347/15 |
| 2003/0151756 | A1 * | 8/2003 | Yamazaki et al. | 358/1.9 |
| 2005/0213128 | A1 * | 9/2005 | Imai et al. | 358/1.9 |
| 2006/0044577 | A1 * | 3/2006 | Weast et al. | 358/1.9 |
| 2006/0061785 | A1 | 3/2006 | Nagoshi et al. | |
| 2007/0019218 | A1 | 1/2007 | Sumi et al. | |
| 2007/0223019 | A1 * | 9/2007 | Maeyama | 358/1.9 |

FOREIGN PATENT DOCUMENTS

JP 2001-47665 2/2001

* cited by examiner

*Primary Examiner* — Samir Ahmed
(74) *Attorney, Agent, or Firm* — Fitzpatrick, Cella, Harper & Scinto

(57) ABSTRACT

The present invention is to provide an image processing device and an image processing method which can perform correction so as to suppress variation in color in consideration of color rendering properties of a light source when preparing data for image formation. In an image processing device according to one embodiment of the present invention, an output density correction value selection unit determines an output density correction value of CMY inks with hue of Gy ink, being an achromatic color material of high light source dependence as a reference. Based on the determined output density correction value, the balance of the CMY inks is corrected.

13 Claims, 12 Drawing Sheets

IMAGE PROCESSING DEVICE, IMAGE PROCESSING METHOD AND RECORDING MEDIUM

BACKGROUND OF THE INVENTION

1. Field of the Invention

The present invention relates to an image processing device and an image processing method and, more particularly, relates to an image processing device and an image processing method of correcting colors of images when converting color and monochrome images to data for image formation processing, such as printing.

2. Description of the Related Art

Conventionally, in a color printer for outputting a color natural image, taking an inkjet printer as an example, in the case of ink replacement or replacement of a head for discharging ink, in some cases, the hue of a print may be varied. This reason for such variation may be due to change of density of ink or the change of discharge characteristics of a head due to fluctuations in the ink lot or the head. When using a color printer for design work, stable hue output is required. Accordingly, variation in hue as described above may be problematic.

To solve these problems, in the techniques disclosed in Japanese Patent Laid-Open No. 2001-047665 and U.S. Pat. No. 6,215,562, density correction of a printer can be performed through visual observation.

Such techniques as disclosed in the conventional Japanese Patent Laid-Open No. 2001-047665 and U.S. Pat. No. 6,215,5622 are focused on density correction itself to provide stable density correction, and are effective techniques.

SUMMARY OF THE INVENTION

In such techniques as disclosed in the conventional Japanese Patent Laid-Open No. 2001-047665 and U.S. Pat. No. 6,215,562, however, color rendering properties of a light source is not taken into consideration. Thus, even if colors are corrected under a certain light source, when this printed matter is observed under a different light source, colors different from those at the time of correction will be reproduced, and correction conditions are not necessarily optimal. This color reproduction is a result of color rendering properties of a light source and spectrum characteristics of the printed matter. Thus, colors of the printed matter are seen as different under different light sources. Thus, the conventional methods have a problem in that proper correction conditions cannot be obtained under initially used light sources.

An object of the present invention is to provide an image processing device and an image processing method which, when preparing data for image formation, can perform color correction so as to suppress variation in color even if printed matter is observed under various light sources (for example, sunlight or a fluorescent lamp).

The present invention is an image processing device configured to generate image data for image formation by an image forming means including means to output a basic color material and means to output an achromatic color material of high light source dependence. The image processing device comprises:

means of determination of an output density correction value of the basic color material with the achromatic color material of high light source dependence as a reference, the image data being generated by performing density correction using the determined output density correction value.

The present invention is an image processing method for generating image data for image formation by an image forming means including means to output a basic color material and means to output an achromatic color material of high light source dependence, the image processing method comprising the step of:

determination of an output density correction value of the basic color material with the achromatic color material of high light source dependence as a reference, the image data being generated by performing density correction using the determined output density correction value.

According to the present invention, by using an achromatic color material of high light source dependence as a reference for determining an output density correction value, original color reproduction can be performed under various light sources.

Further features of the present invention will become apparent from the following description of exemplary embodiments (with reference to the attached drawings).

DESCRIPTION OF THE EMBODIMENTS

Figure 1:
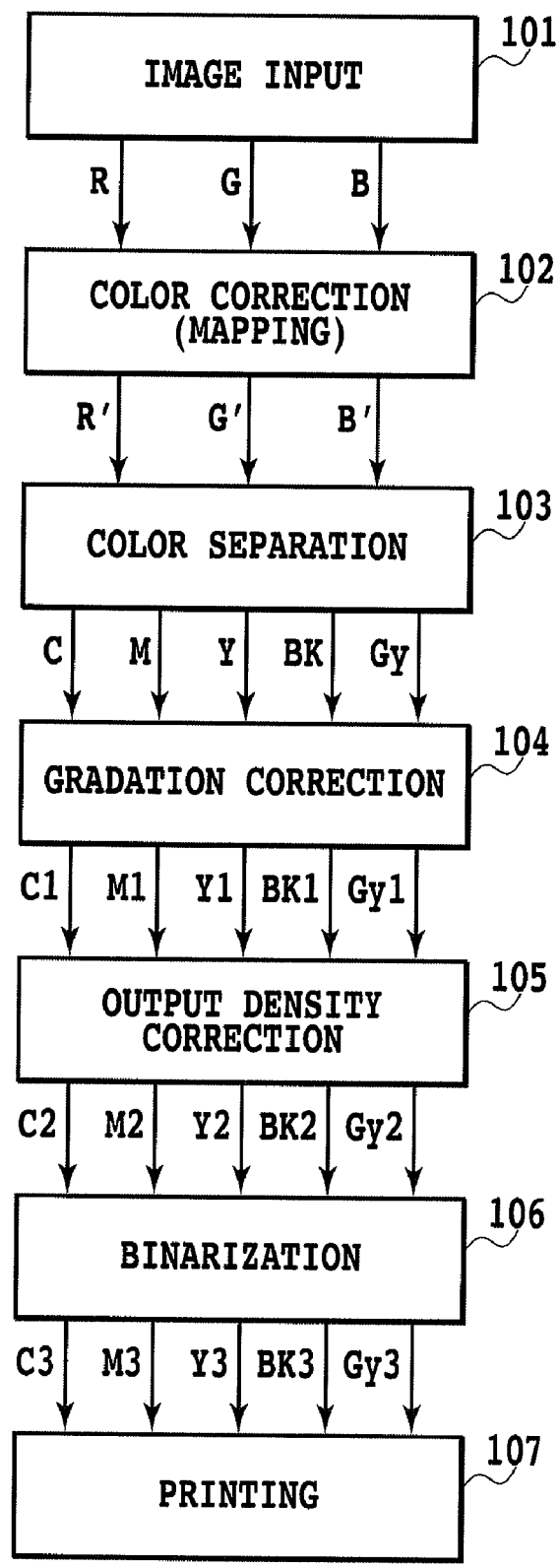
FIG. 1 is a block diagram or a flowchart of image data processing according to one embodiment of the present invention.

Hereinafter, preferred embodiments according to the present invention will be described in detail referring to the drawings. However, it should be appreciated that components described in these embodiments are only for exemplification, the scope of this invention is not limited thereto. Incidentally, in the drawings that will be described hereinafter, like reference numerals refer to parts having the same functions, and repeated descriptions thereof will be omitted.

Figure 12:
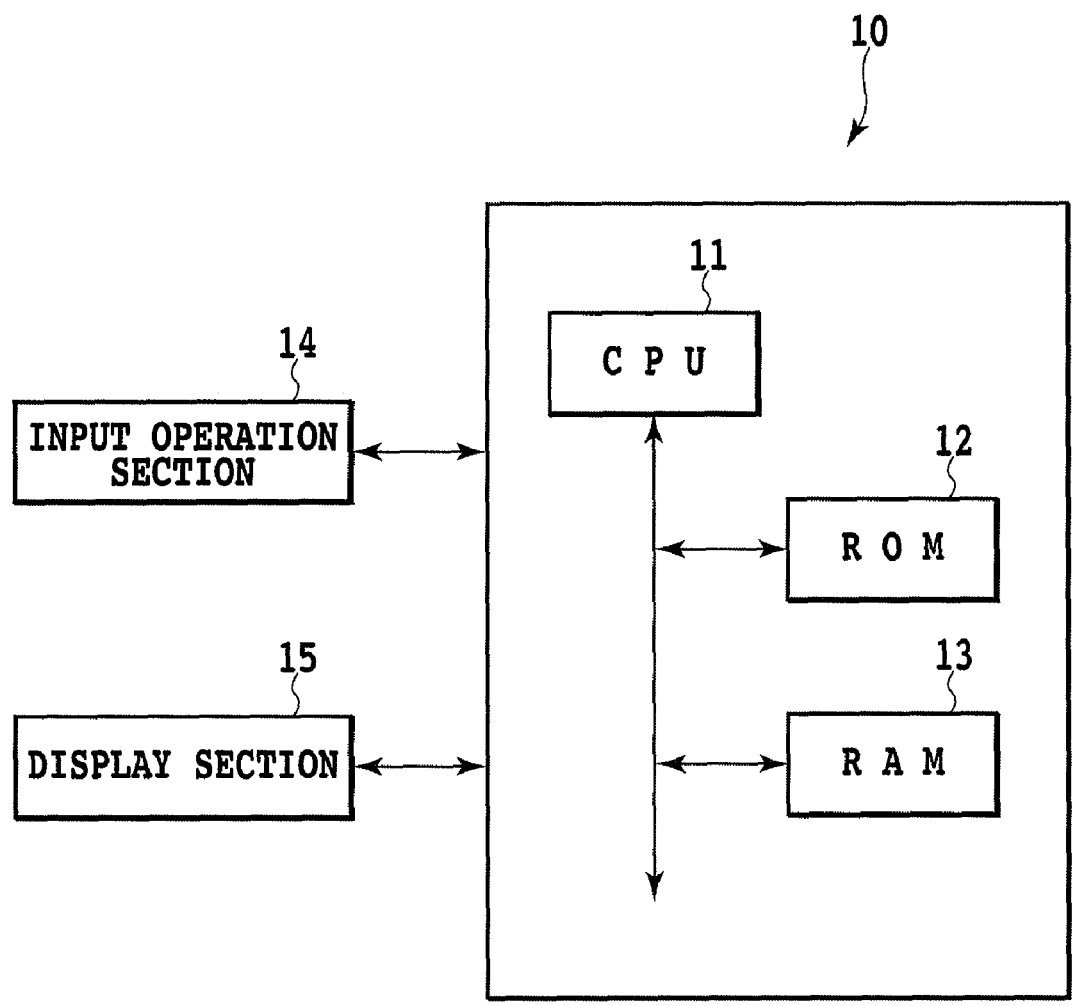
FIG. 12 is a block diagram illustrating a schematic configuration of a control system provided at an image processing device according to one embodiment of the present invention.

FIG. 12 is a block diagram illustrating a schematic configuration of a control system in an image processing device according to one embodiment of the present invention.

In FIG. 12, a control unit 10 acts as a control means controlling the entire image processing device. This control unit 10 includes a CPU 11 executing processing operations such as various types of computing, controls and other determinations. Furthermore, the control unit 10 includes: a ROM 12 storing e.g., a processing control program that is executed by the CPU 11 and will be described below with reference to FIGS. 1 and 2; and a RAM 13 for temporarily storing data in processing operations of the CPU 11 or input data.

Connected to the control unit 10 are an input operation unit 14 including a keyboard or various switches for inputting a predetermined command or data, and a display unit 15 for providing various displays including input and setting states of the image processing device.

The important of the present invention is that when converting a color image expressed by RGB to data for image formation (CMY image data), without depending on a light source, similar colors of an image. Therefore, in one embodiment of the present invention, with an achromatic color material which is highly dependent on a light source (for example, an achromatic color ink or toner other than black) as a reference, an output correction density value of basic color materials (for example, C, M and Y inks or toners) is determined. Thus, according to the present invention, it is important to make the above-discussed determination, and it is not essential as to which device makes this determination. That is, this processing according to the present invention may be applied to an image forming device such as a printer, or may be applied to a computer such as PC.

First Embodiment

A first embodiment will be described referring to the drawings. In this embodiment, an example in which an image processing device including the control unit 10 is applied to an image forming device provided with an image forming unit will be described.

In this embodiment, as an image forming unit, an example of an ink-jet color printer will be given. The image forming unit is not limited to an ink-jet color printer, but a color printer of other systems, for example, an electrophotographic system or dye sublimation type may be employed.

An inkjet printer as an image forming means according to this embodiment is provided with recording heads for discharging respective inks of C (cyan), M (magenta), Y (yellow), BK (black) and Gy (gray). That is, it is provided with a C ink recording head, a M ink recording head and a Y ink recording head that act as means to output a basic color material, and a BK ink recording head and a Gy ink recording head that act as means to output an achromatic color material.

A BK achromatic ink of two colors (achromatic color materials) of BK and Gy is manufactured from carbon and the like, and has low light source dependence. On the other hand, a Gy ink is made by mixing C, M and Y inks (basic color materials) and has high light source dependence. Hereinafter, descriptions will be made with reference to the drawings.

Figure 3:
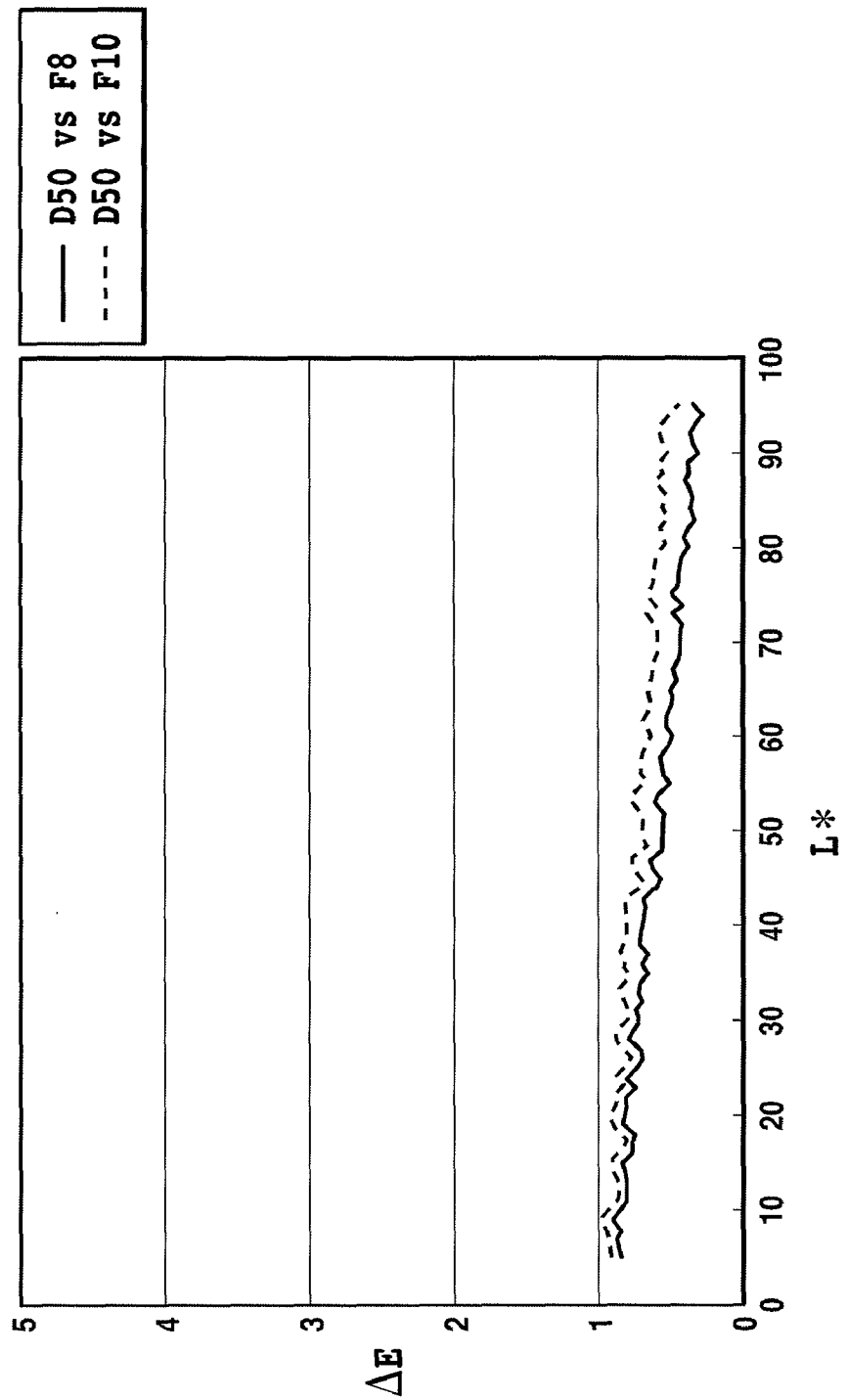
FIG. 3 is a chart showing a graph of color constancy of BK ink with D50 light source as a reference according to one embodiment of the present invention.
Figure 4:
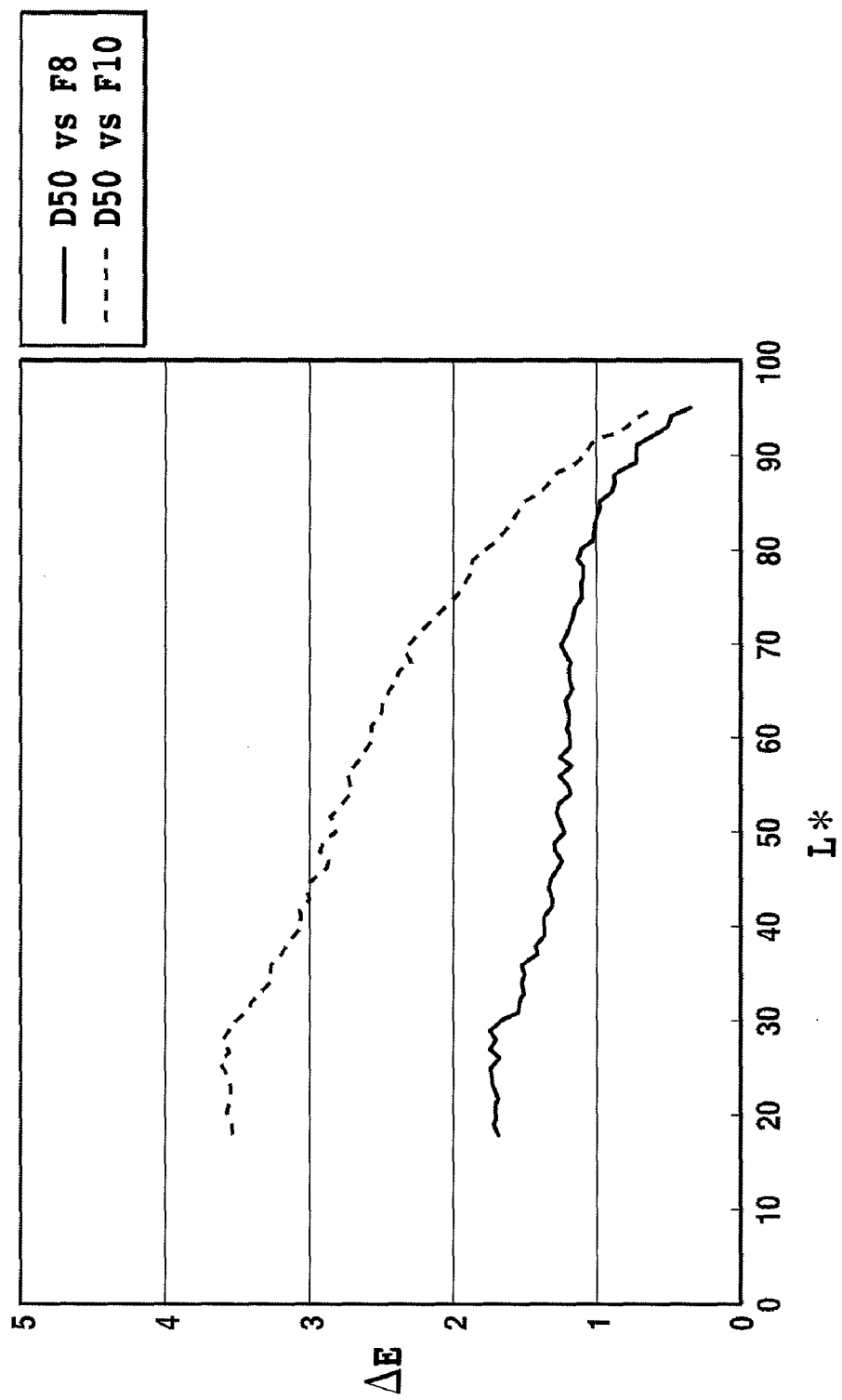
FIG. 4 is a chart showing a graph of color constancy of C+M+Y with D50 light source as a reference according to one embodiment of the present invention.
Figure 5:
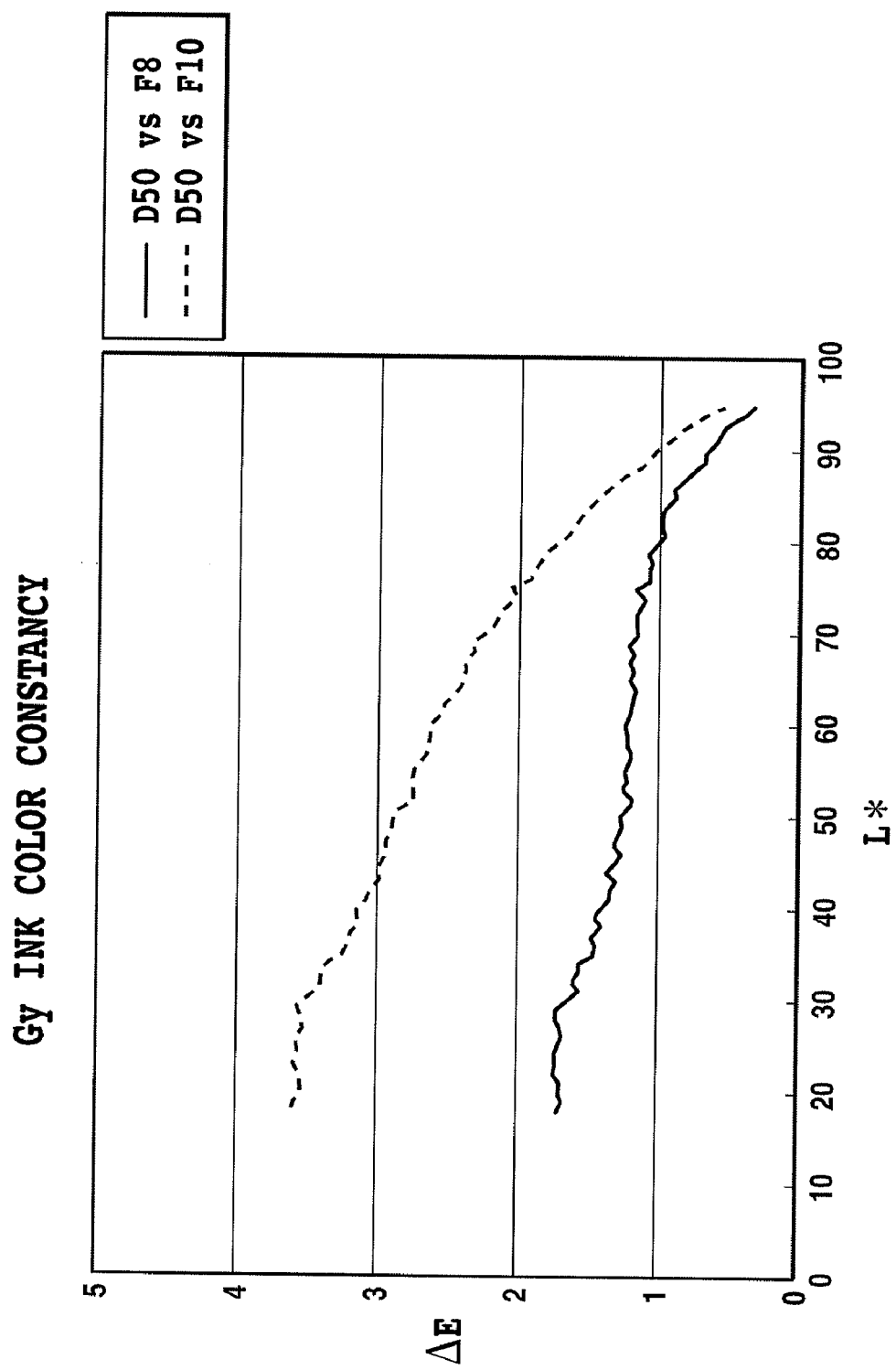
FIG. 5 is a chart showing a graph of color constancy of Gy ink of a first embodiment with D50 light source as a reference according to one embodiment of the present invention.

FIGS. 3 to 5 are graphs of color constancy, with a D50 light source as a reference. FIG. 3 represents the case of printing with BK ink, FIG. 4 represents the case of reproducing an achromatic color (gray) using C, M and Y inks, and FIG. 5 represents the case of printing with Gy ink to be used in this embodiment. In FIGS. 3 to 5, the abscissas axis represents a luminance ($L^*$) at the time of measurement under a D50 light source, and the ordinates axis represents a color difference ($\Delta E$) between at the time of observation under a D50 light source and at the time of observation of the same patch under different light source.

As shown in FIG. 3, in a patch that is printed using BK ink according to this embodiment, under a F8 light source and a F10 light source, there is observed only an extremely small change of 1.0 or less in the value of $\Delta E$ from when measured under a D50 light source. That is, the BK ink is an ink in which appearance of color is less likely to vary even if a light source is changed. Such BK ink is referred to as those of low light source dependence.

That is, in this specification, the phrase "light source dependence is low" means that with respect to a predetermined color, a color difference between the time of measurement under the first light source and the time of measurement under the another light sources is smaller than a predetermined value. What satisfies this requirement is shown in FIG. 3. The BK ink according to this embodiment is manufactured with carbon of a stable spectrum as a component, and is not in the state of mixed spectra of various dyes. As a result, the BK ink according to this embodiment is an achromatic ink of low light source dependence.

As shown in FIG. 4, in the case of reproduction of an achromatic color using C, M and Y inks, with the D50 light source as a reference, although $\Delta E$ is 2 or less under the F8 light source, $\Delta E$ may exceed 3.5 under the F10 light source in some ranges. In this way, the C, M and Y ink which has the large $\Delta E$ and which color appears to be varied depending on a light source is said to be of high light source dependence. In addition, likewise, since the Gy ink according to this embodiment is an ink that is manufactured by mixing C, M and Y inks, a printed matter using the Gy alone and a printed matter using C, M and Y have the same characteristics. Thus, FIG. 5 representing color constancy of the Gy ink and FIG. 4 at the time of using C, M and Y inks in combination have substantially the same shape, and both of inks can be said to be of high light source dependence.

According to this specification, the phrase "light source dependence is high" means that with respect to a predetermined color, a color difference between the time of measurement under the first light source and the time of measurement under the other light sources is a predetermined value or greater than a predetermined value. What satisfies this requirement is shown in FIGS. 4 and 5.

The Gy ink according to this embodiment is manufactured using color materials (Y ink, M ink and C ink as basic color materials) in which color saturation is largely varied as they are put onto a recording medium such as paper. Therefore, Gy ink is in the state in which dyes having various spectrums are mixed. As a result, the Gy ink according to this embodiment satisfies the above-described requirements as an achromatic ink of high light source dependence.

In recent years, some printers perform image processing in consideration of light source dependence. For example, a printed matter of a printer that is designed with a D50 standard light source, by making an adjustment of colors intended to reproduce under this light source, can achieve originally good color reproduction under the D50 light source. However, looking at the printed matter under different light sources, depending on the light source dependence of the printed matter, colors different from expected color reproduction could be observed. Thus, recently, there are many printers that are set so as to prevent unfavorable color reproduction due to light source dependence in consideration of a plurality of light sources. In this case, even if observation is made under any light source, although the optimum color reproduction is not performed, substantially favorable color reproduction is achieved. The present invention, as described below, makes it essential, when performing correction not dependent on a light source, to employ an achromatic color material as a reference and to determine an output density correction value so as to make printer's original color reproduction. That is, this correction takes a role of returning variation in hue of a device to the state of making a favorable color reproduction under a plurality of light sources. Furthermore, the present invention, when performing correction dependent on a light source, corrects so as to reproduce optimum color under this light source.

FIG. 1 is a diagram illustrating a processing flow of image data executed by the control unit 10 in an ink-jet color printer according to this embodiment.

Image data formed of RGB (red, green and blue) having been input at an image input unit 101 is sent to a color correction (mapping) unit 102. The color correction (mapping) unit 102, with respect to the RGB image data input from the image input unit 102, performs a mapping processing so as to obtain target RGB values. R'G'B' image data, being data after mapping, is sent to an ink color separation unit 103. The color separation unit 103 converts the R'G'B' image data to image data of C, M, Y, BK and Gy, (data separated into ink colors). The data separated into ink colors is sent to a gradation correction unit 104.

Figure 6:
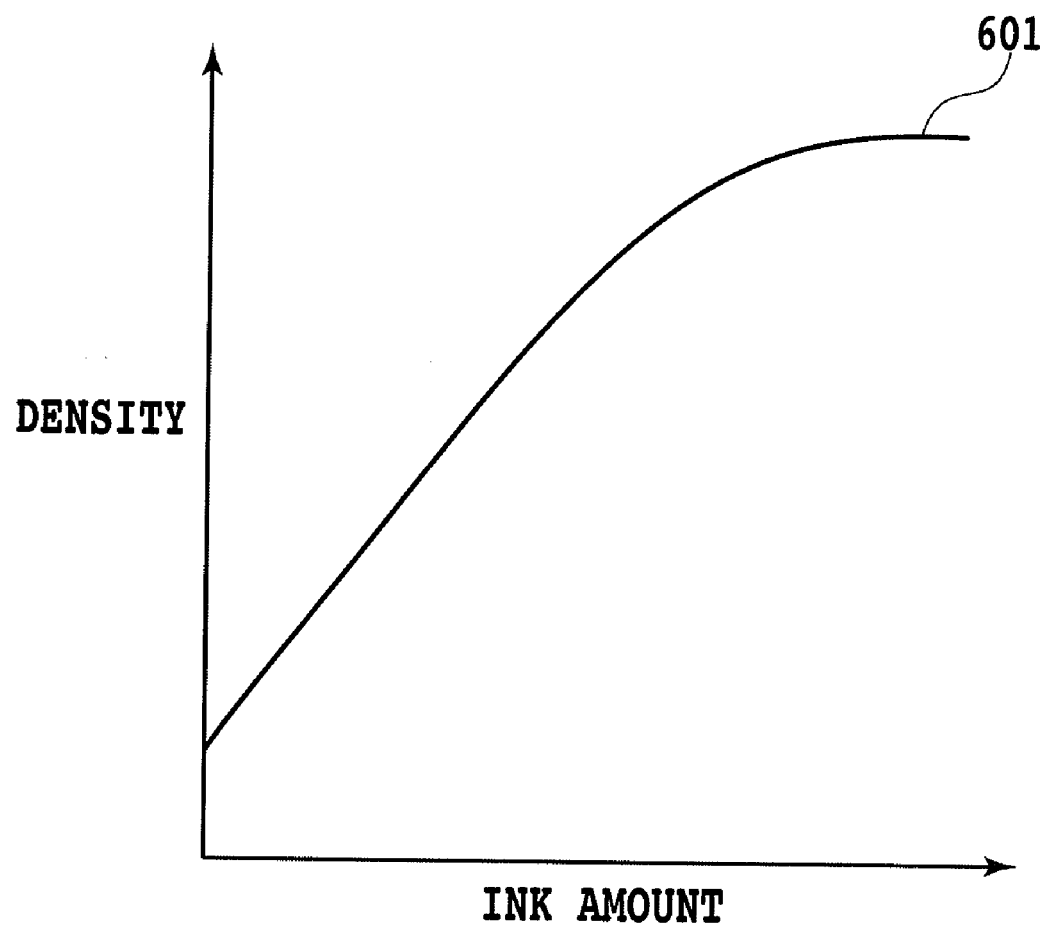
FIG. 6 is a chart showing a graph of density with respect to an ink amount according to one embodiment of the present invention.

The gradation correction unit 104, based on data separated into ink colors transmitted from the color separation unit 103, makes a correction of gradation with respect to each color of C, M, Y, BK and Gy. The gradation correction applies a gamma correction in order so as to provide a correlation between values of C, M, Y, BK and Gy to be processed as signal values at the color correction unit and values (e.g., $L^*a^*b^*$) of colors to be output to be linear. FIG. 6 is a graph representing the amount of ink having been put on a page space and the density of the image formed using this ink. There are characteristics such that as the amount of ink to be applied is increased by degrees, although at first the density is increased linearly, the density is less likely to increase on the way.

Figure 7:
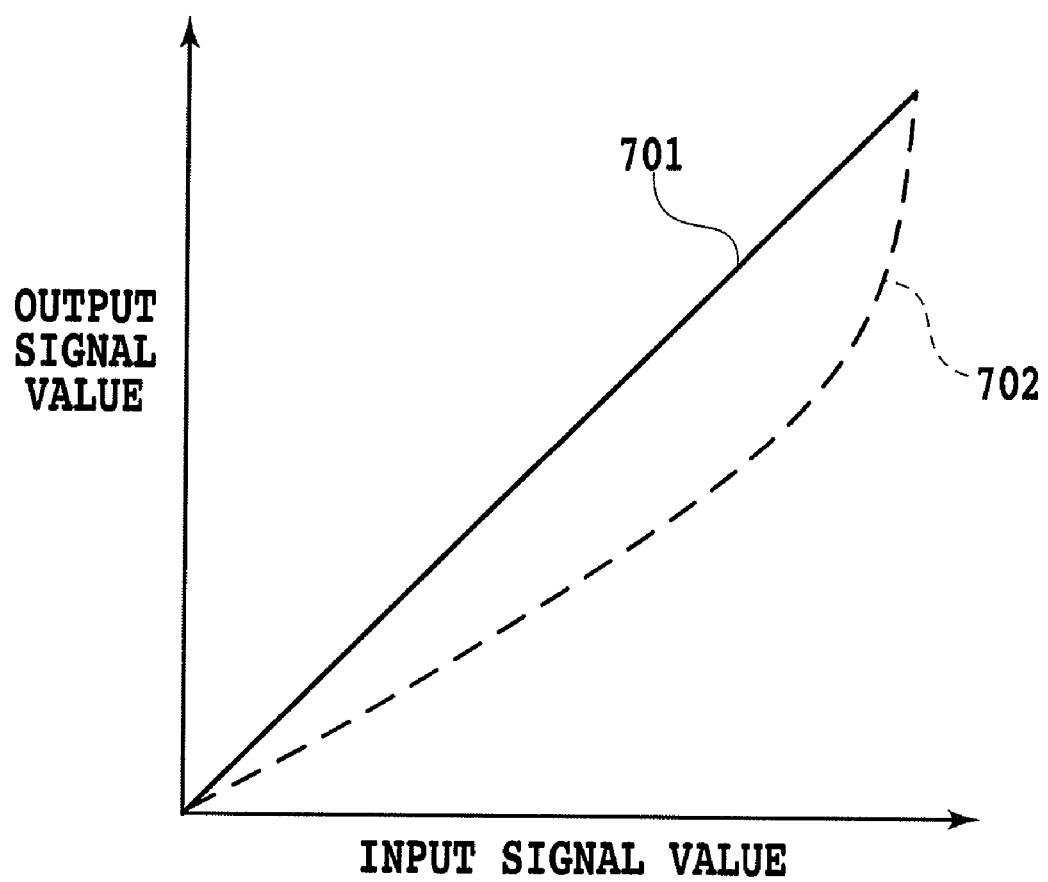
FIG. 7 is a chart showing a graph of the relation of an output with respect to an input at a gradation correction unit according to one embodiment of the present invention.
Figure 8:
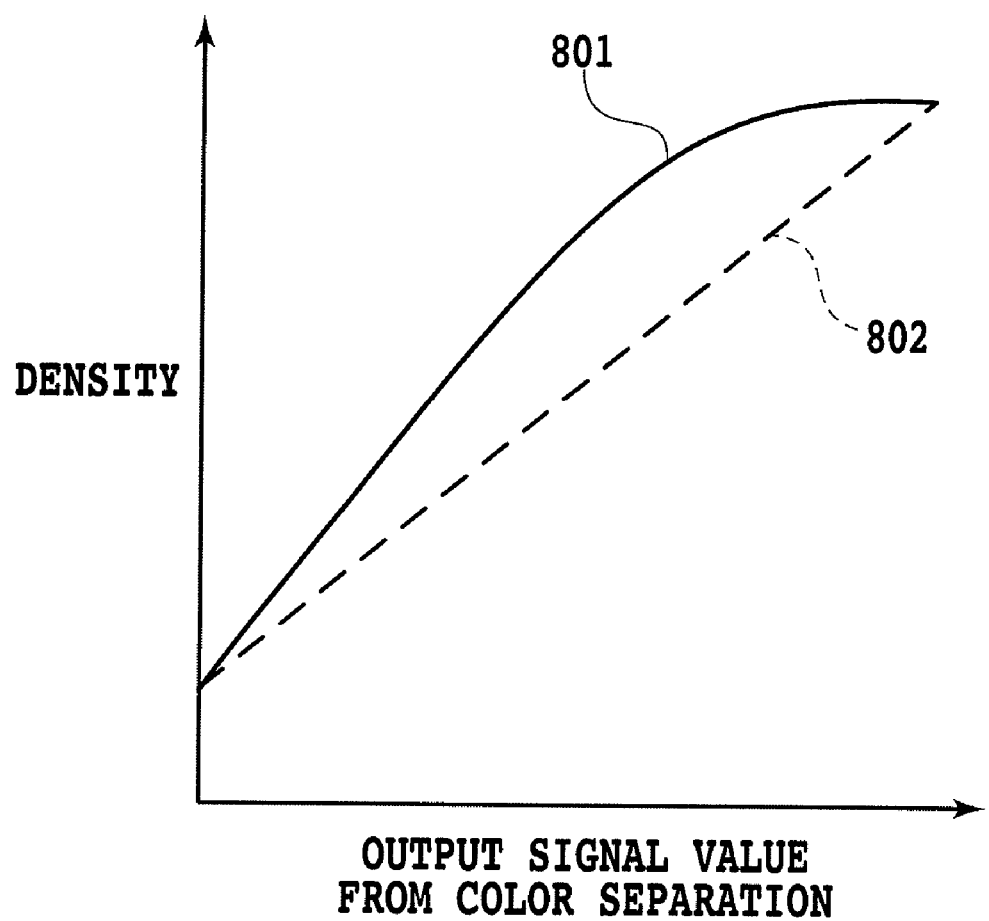
FIG. 8 is a chart showing a graph of density with respect to an output signal value from a color separation unit according to one embodiment of the present invention.

FIG. 7 represents the relationship between an input signal and an output signal at the gradation correction unit 104. FIG. 8 represents the relationship between an output signal value from the color separation unit 103 and the density of a printed matter. For example, when using an output signal that is linear with respect to an input signal as indicated by a reference numeral 701 of FIG. 7, from characteristics represented in FIG. 6 as described above, the relationship between an output signal from the color separation unit 103 and the density of a printed matter is as indicated by a reference numeral 801 of FIG. 8. At this time, although in the first half of signal values, the change of a density with respect to a signal value is in a nearly linear state, in the second half of signal values, the density is less likely to change even if the signal value is changed. Therefore, the reference numeral 801 undergoes de-gamma correction, and the relationship between an input signal and an output signal is as indicated by a reference numeral 702 of FIG. 7. When the line which represented by reference numeral 702 is used, the relationship between an output signal from the color separation unit 103 and a density of a printed matter is to be linear as indicated by a reference numeral 802. Thus, the gradation correction unit 104 corrects the relationship between the output signal from the color separation unit and the density of a printed matter.

Each color data ($C_1$, $M_1$, $Y_1$, $BK_1$ and $Gy_1$ image data) after gradation correction is sent to an output density correction unit 105. The output density correction unit 105 corrects an output balance of CMY using an output density correction value to be obtained at the below-described output density correction value determination unit 204.

The output density correction unit 105 serves two purposes. One is to correct fluctuations in output characteristics of an ink head due to replacement of an ink head or an ink tank, or fluctuations in ink density using a calibration function in order to obtain print results having the same hue as that before replacement. By this execution, the above-discussed fluctuations can be compensated, and color reproducibility can be stabilized. The other one is to make a correction so as to reproduce an original achromatic color when a signal which should be reproduced as gray is input.

Figure 9:
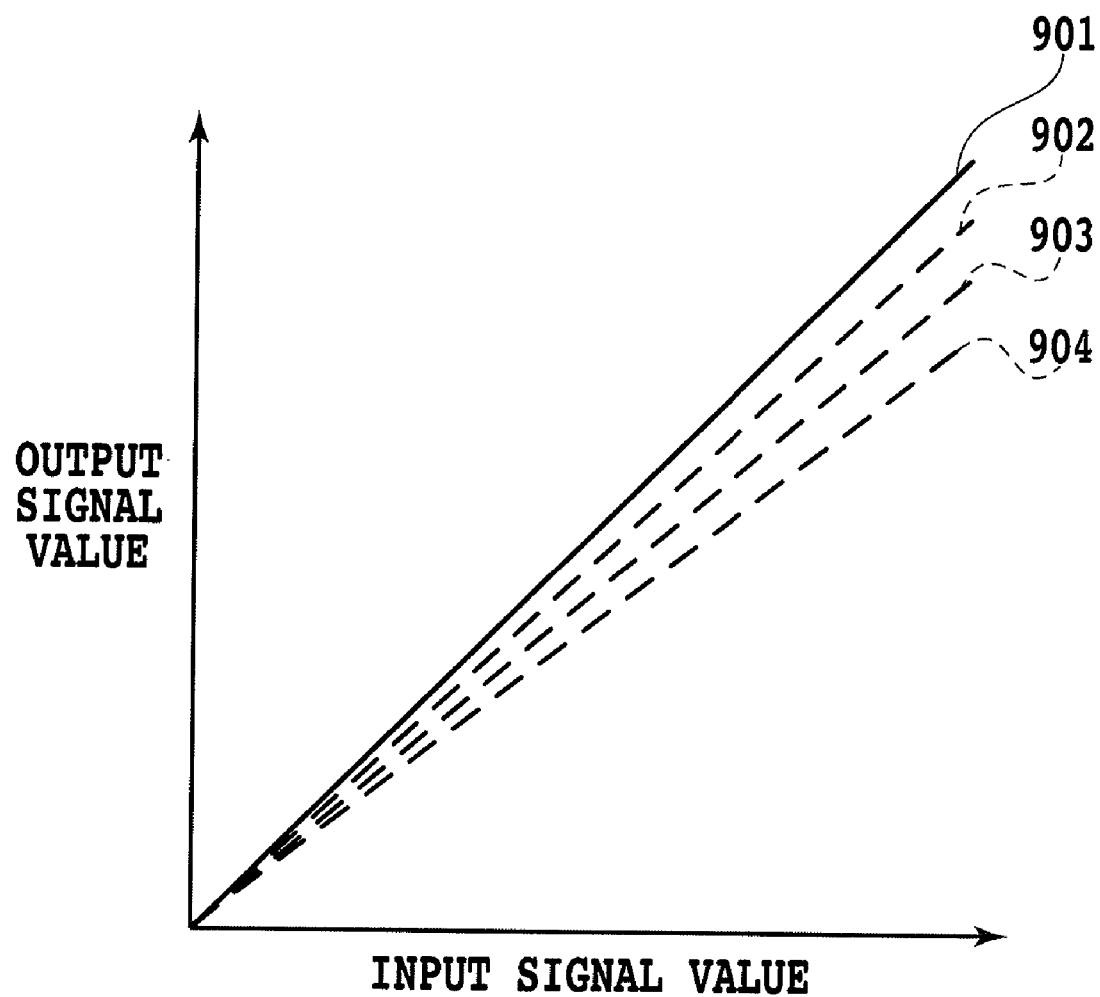
FIG. 9 is a chart showing a graph of an output with respect to an input at an output density correction unit according to one embodiment of the present invention.

FIG. 9 represents the relationship between an input signal and an output signal of the output density correction unit 105. Output density correction is performed with respect to each of C, M and Y. For example, assuming that output density correction values are

C: 1.00
M: 1.00
Y: 0.95, with respect to C and M, as shown by reference numeral 901 of FIG. 9, an output is to be the same value with respect to an input. With respect to Y, as shown by reference numeral 902, such an operation that the ink amount is 0.95 times the normal amount is made, and the output is made to decrease with respect to the input. In such way, the output density correction unit 105 adjusts the balance among C, M and Y. Descriptions of the output density correction value will be given below.

Although in this embodiment, an output is decreased with respect to an input is employed, the present invention is not limited to this decreased pattern, but the output may be increased with respect to the input.

The data having been subjected to output density correction at the output density correction unit 105 ($C_2$, $M_2$, $Y_2$, $BK_2$ and $Gy_2$ image data) are sent to a binarization unit 106. The binarization unit 106 converts the $C_2$, $M_2$, $Y_2$, $BK_2$ and $Gy_2$ image data to a binary data ($C_3$, $M_3$, $Y_3$, $BK_3$ and $Gy_3$ image data) by the error diffusion method or dithering. The binary data ($C_3$, $M_3$, $Y_3$, $BK_3$ and $Gy_3$ image data) are sent to a printing unit 107. The printing unit 107 makes a print onto a sheet based on the binary data. In this embodiment, descriptions are made using the inkjet printer as an example, so that the printing unit 107 is constructed at least to include ink recording heads for discharging inks of C, M, Y, K and Gy.

A quantization number is to be set based on gradation characteristics of a printer. Thus, although in this embodiment two values are used, N values of three values or more may be used.

An image processing device, by color conversion of an image data in a color space (R, G, B) having been input, creates image data of a color space to be specified by ink colors. Colors for specifying this color space may include BK or Gy. The data having been created in such manner will be image data for image formation using C, M and Y inks (basic color materials) and BK and Gy inks (achromatic color materials).

Figure 2:
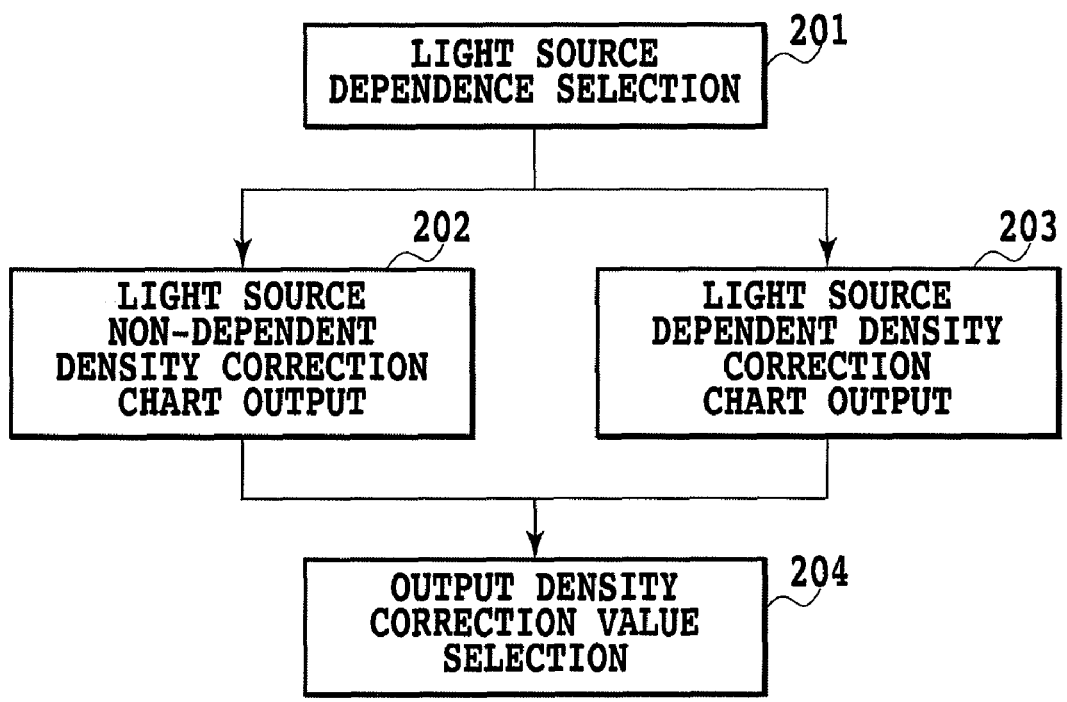
FIG. 2 is a processing flow of output density correction value determination determining an output density correction value according to one embodiment of the present invention.

FIG. 2 is a block diagram representing a processing flow of output density correction value determination of determining an output density correction value to be used at the output density correction unit 105.

A light source dependence selection unit 201 allows a user to select correction dependent on a light source or correction not dependent on a light source. That is, the light source dependence selection unit 201 displays a user interface at the display unit 15 with which a user selects the correction dependent on a light source or the correction not dependent on a light source with respect to an image being processed now. Subsequently, when a user inputs the method of correction using the input operation unit 14, the light source dependence selection unit 201 receives a user input indicating the method of this correction. It is preferable that for the user interface, four choices are displayed (1) "D50 light source", (2) "F8 light source", and (3) "F10 light source", and (4) "no specification of a light source". Further, when choices (1) to (3) are selected by a user, the correction dependent on each light source is selected; and when (4) is selected, the correction not dependent on a light source is selected. The light source dependence selection unit 201, based on this user input, selects either the correction dependent on a light source or the correction not dependent on a light source. In such way, the light source dependence selection unit 201 selects whether or not an output image is dependent on a light source. When the light source dependence selection unit 201 selects the correction not dependent on a light source in response to a user input, operation goes to a processing 202.

In this specification, "correction dependent on a light source" is correction for the case in which a user looks at a printed matter under a certain specified light source. According to this embodiment, in the correction dependent on a light source, with a color patch that is output using an achromatic color material (for example, BK ink) of low light source dependence among achromatic color inks used as a reference, an output density correction value is determined.

Further, in this specification, "correction not dependent on a light source" is correction for the case in which a user may look at a printed matter under any light source, being independent of a light source. According to this embodiment, in the correction not dependent on a light source, with a color patch that is output using an achromatic color material (for example, Gy ink) of high light source dependence among achromatic color inks used as a reference, an output density correction value is determined.

A light source non-dependent output density correction chart output unit 202 outputs a plurality of gray patches created using CMY inks and a gray halftone patch printed using a single color of Gy ink on a recording paper. The patch created using CMY inks, in case of using an ideal printer with no error or displacement and does not require output density correction, will be of the same color as the patch of a single color of Gy. Based on this patch, patches are output (group) in which the CMY balance is changed gradually from a basic balance such as a patch of only C being decreased, a patch of only M being decreased, a patch of only Y being decreased, a patch of C and Y being decreased, a patch of M and Y being decreased and a patch of C and Y being decreased.

That is, when the correction not dependent on a light source is selected at the light source dependence selection unit 201, the light source non-dependent output density correction chart output unit 202 reads out data (data for patch creation) for creating the above-discussed patches for which CMY balance are gradually changed, the output data having been preliminarily stored in the ROM 12. Further, based on this data, the gray patches to be formed using CMY inks are printed on a recording paper. In addition thereto, the light source non-dependent output density correction chart output unit 202 reads out data (data for patch creation) for creating a gray halftone patch that has preliminarily been stored in the ROM 12. Furthermore, based on this data, the gray patch to be formed using Gy ink is printed on a recording paper. In such way, the light source non-dependent output density correction chart output unit 202 prints on a recording paper the patch having been reproduced using the Gy ink and the patches having been reproduced using the CMY inks.

The patches are for selecting the CMY balance (output density correction value with respect to C, M and Y) when making output density correction with a single color of Gy ink as a reference.

When the light source dependence selection unit 201 selects the correction dependent on a light source in response to a user input, the operation goes to a processing 203.

The light source dependent output density correction chart output unit 203 outputs a plurality of patches in the same manner as the processing by the light source non-dependent output density correction chart output unit 202. The point different from the processing by the light source non-dependent output density correction chart output unit 202 is as follows. While at the light source non-dependent output density correction chart output unit 202, a single color of Gy ink of high light source dependence is printed as a reference color, the reference color to be used at the light source dependent output density correction chart output unit 203 is BK ink of low light source dependence. Details are the same as the processing by the light source non-dependent output density correction chart output unit 202, so that descriptions will be omitted. In such way, the light source dependent output density correction chart output unit 203 prints on a recording paper a patch that is reproduced using BK ink and patches that are reproduced using CMY inks. Incidentally, the light source non-dependent output density correction chart output unit 202 and the light source dependent output density chart output unit 203 are embodied by the printing unit 107.

An output density correction value selection unit 204 selects an output density correction value using the patch having been output at the light source non-dependent output density correction chart output unit 202 or the light source dependent output density correction chart output unit 203. In specific, for example, a user, based on the above-mentioned printed patches, selects the patch to be a reference having been output using an achromatic color ink alone and the patch of CMY balance which color difference is the minimum. Next, a user, on an input screen displayed at the display unit 15, inputs the above-mentioned selected patch (number or information of specifying the patch) through the input operation unit 14. The output density correction value selection unit 204 receives a user input regarding the selected patch having been input by this user, and based on this user input, obtains the patch having been selected by the user (number or information of specifying the patch).

In this embodiment, selection of the above-mentioned patch may be made through visual observations or may be performed using a measuring instrument. In the case of visual observations, to easily make comparison, adjacent to the patch printed using Gy or Bk ink, the patches (group) which CMY balance is changed gradually from the basic one may be printed. When the selection is made using the measuring instrument that is connected to an image processing device, the measuring instrument makes a color measurement of the printed patches, and transmits these color measurement results to the image processing device. The output density value correction selection unit 204, based on these color measurement results having been transmitted, extracts the patch to be a reference having been output using an achromatic color ink alone and the patch of CMY balance which color difference is the minimum.

In such way, the output correction value selection unit 204, based on the output patch, determines the density correction value of CYM inks.

Incidentally, when there is no desired patch among the printed patches, and for example, the patch of CMY balance between that of the first patch and that of the second patch that are included in the printed patches, is intended to select, a patch of CMY balance between that of the first patch and that of the second patch may be newly created and printed. At this time, on the input screen displayed at the display unit 15, a user only has to specify the first patch and the second patch through the input operation unit 14. Further, based on this specification, the image processing device only has to create the patch of CMY balance between that of the first patch and that of the second patch, and to execute subsequent processing.

When the light source dependence selection unit 201 selects the correction dependent on a light source, the light source dependent output density correction chart output unit 203, with a single color of BK ink as a reference, outputs patches for selection of CMY balance at the time of output density correction. Subsequently, the light source dependence selection unit 201, through visual observations under an intended light source, or using a measuring instrument in which this light source has been set, selects the patch to be a reference (having been output using single color of BK and the patch of CMY balance which color difference is the minimum. By employing BK of low light source dependence reproducing substantially the same color under any light source as a reference, the balance of CMY to be optimal under an intended light source can be obtained.

When observations are made under another light source different from the intended light source, however, there is a possibility of color reproduction different from the intended one. For example, when the patch of a certain CMY balance under the D50 light source, and an output density is corrected, as illustrated in FIG. 4, reproduced colors will be different from intended colors such that the maximum value of ΔE under the F8 light source is about 1.7, and the maximum value of ΔE under the F10 light source is about 3.5.

Whereas, when the light source dependence selection unit 201 selects the correction not dependent on a light source, the light source non-dependent output density correction chart output unit 202 outputs the patch of a single color of Gy ink. Further, the output density correction value selection unit 204, with the patch of a single color of Gy ink as a reference, determines an output density correction value. In such way, by using the patch of a single color of Gy ink as a reference, the patch of a single color of Gy and the patch in which an achromatic color is reproduced with CMY exhibit the same change of color under various light sources. Thus, even if selection is made under any light source, the printer's original CMY balance can be obtained.

In such manner, according to this embodiment, since colors are matched with the Gy ink as a reference, preferably, the color constancy of the Gy ink has equivalent characteristics to (coincident with) the color constancy when an achromatic color is reproduced with CMY.

Here, effects of using an achromatic color ink as a reference will be described.

As described above, there are fluctuations in output characteristics of a printer due to e.g., individual differences of ink heads or replacement of an ink tank. These fluctuations occur with both color materials (C, M and Y) and achromatic color materials (Gy and BK).

In general, color materials have characteristics such that as inks are put onto papers, luminance (L*) is changed as well as color saturation (elements of a* and b*) is also changed. On the other hand, achromatic color materials have such characteristics that as inks are put onto papers, although luminance (L*) is changed, color saturation (elements of a* and b*) is less likely to change. Therefore, in the case of achromatic color materials, even if the ink amount to be output is varied due to the above-mentioned fluctuations in output characteristics, although the luminance is affected to some extent, the hue (a* and b*) of achromatic colors is less likely to be affected.

That is, when an achromatic color is reproduced using CMY inks, if regular output characteristics are not satisfied due to fluctuations of any one of C ink, M ink and Y ink, color reproduction of achromatic colors is not performed. Such an achromatic color ink as Gy can make color reproduction of substantially proper hue (a*, b*) even if no regular output characteristics are achieved due to fluctuations.

Accordingly, it is effective to match hue with an achromatic color material as a reference. In addition, from this angle of visual characteristics of human kinds of being sensitive to changes of colors in the vicinity of an achromatic color, since it is easy to sense even a little unbalance of C, M and Y, the correction using an achromatic color is effective.

According to this embodiment, although a gray patch is used for selection of an output density correction value, since correction is to adjust the balance of CMY, processing is not only in the gray region but also in the entire region of color reproduction range of a printer.

The output density correction unit 105, using an output density correction value having been selected at the output density correction value selection unit 204, corrects the amount of ink to be output at the printing unit 107. Specifically, assume that values having been selected at the output density correction value selection unit 204 are C: 1.00, M: 1.00 and Y: 0.95, and signal values of each color having been output from the gradation correction unit 104 are multiplied by these rates. That is, these signal values will be as follows.

$C2 = C1 \times 1.00$
$M2 = M1 \times 1.00$
$Y2 = Y1 \times 0.95$
$BK2 = BK1$
$Gy2 = Gy1$ The signals of each color ($C_2$, $M_2$, $Y_2$, $BK_2$ and $Gy_2$ image data) having been obtained as described above are sent to the binarization unit 106 to be binarized. Although in this embodiment, the ink amounts to be output at the printing unit 107 are in a proportional relationship with respect to the input signal values of the binarization unit 106, the embodiment is not limited thereto. For example, in the case in which a complicated processing is made with respect to an input signal value of the binarization unit 106, and the correlation between an input signal and an output signal has characteristics such as to be non-linear, output density correction only has to be made in consideration of the correlation with respect to the ink amount of actually output at the printing unit 107.

After binarization, a print is made on the sheet space at the printing unit 107, and an image which CMY balance has been corrected is output.

In such way, in this embodiment, when a light source of observing a printed matter is determined, a good image can be obtained under this light source; and when no light source for observing the printed matter is determined, a printer's original color reproduction can be obtained.

Furthermore, this embodiment is characterized in that color rendering properties of a light source not having been taken into consideration in conventional techniques is considered, by using an achromatic ink of characteristics equivalent to the color constancy when an achromatic color is reproduced using CMY inks, the CMY balance can be corrected to be to the state of supposed center. In addition, even if the correction on this occasion is made under any light source, the same result can be obtained.

Although in this embodiment, the system in which the correction of using Gy ink as a reference and the correction of using BK ink as a reference can be selected is described, the embodiment is not limited thereto. It is a matter of course that a system of only the method of correction by use of Gy ink as a reference. That is, what is important in this embodiment is that color rendering properties of a light source is taken into consideration, and independent of a light source, a printed matter is reproduced in good colors. For this purpose, in this embodiment, with an achromatic color material of high light source dependence, such as Gy ink is a reference, an output density correction value is determined.

However, as with this embodiment, it is effective for the conveniences of a user to allow a user to select the form of correction with an achromatic color material of high light source dependence as a reference or the form of correction with an achromatic color material of low light source dependence as a reference. When correction is made with an achromatic color material of low light source dependence such as BK ink as a reference, as described above, although it is under a specified light source, an optimumhue can be reproduced. Thus, when observation of a printed matter under a specified light source, for example, a fluorescent lamp is supposed, it comes to be effective to make a correction with an achromatic color material of low light source dependence as a reference. On the other hand, when observation under various light sources is supposed, by correction with an achromatic color material of high light source dependence as a reference, although it is not yet optimal, good colors under any light source can be reproduced. Consequently, as is this embodiment, due to that switching between these corrections can be made depending on supposed observation environments of a printed matter, such a printed matter as to be requested from a user can be output.

Furthermore, although in this embodiment, a printer mounted with C, M, Y, BK and Gy inks is used; the colors are not limited thereto. For example, a printer provided with inks such as lc (light cyan), lm (light magenta), R (red), G (green), B (blue), and lg (light gray) may be used.

In addition, although a single color of BK or Gy ink is used as an achromatic color material as a reference color, e.g., lg ink may be used insofar as it is an achromatic color ink, or achromatic color inks in combination may be used. Furthermore, in creation of a reference patch when making an output density correction that is dependent on a light source, preferably an achromatic color ink of the lowest light source dependence is used.

Second Embodiment

In the first embodiment, description was made of using a BK ink of low light source dependence or a Gy ink of high light source dependence, made by mixing C, M and Y inks as a reference. In this second embodiment, when the light source dependence of Gy is higher than that when CMY are mixed on the sheet space, the patch to be a reference is output using Gy and BK so as to be close to the light source dependence when CMY are mixed on the sheet space.

Figure 10:
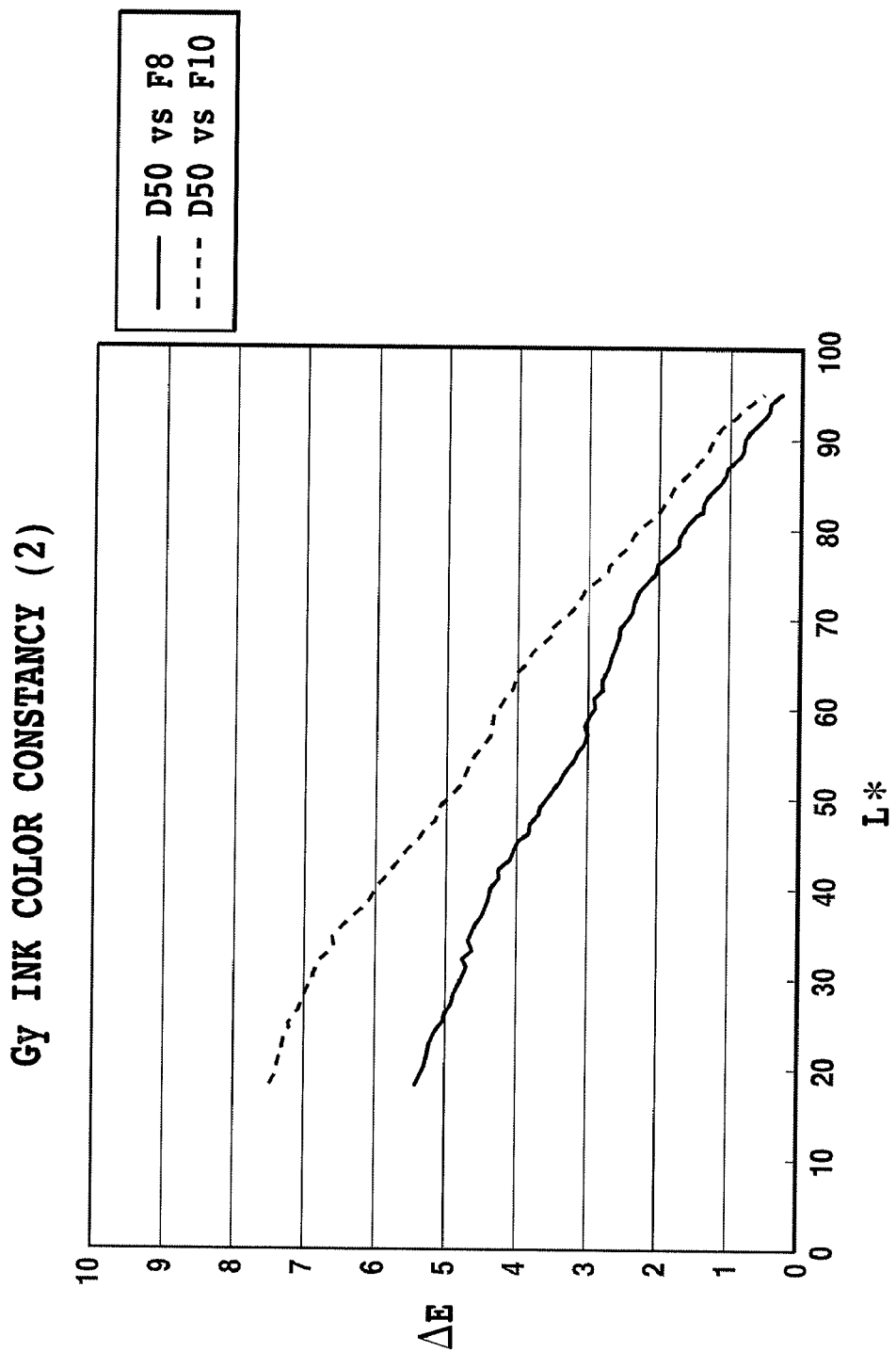
FIG. 10 is a chart showing a graph of color constancy of Gy ink according to a second embodiment with D50 light source as a reference according to one embodiment of the present invention.

Descriptions will be made referring to the drawings hereinafter. FIG. 10 is a chart representing color constancy of a Gy ink in this embodiment. As in FIGS. 3 to 5, the axis of abscissas represent L* at the time of measurement under the D50 light source, and the axis of ordinates represents a color difference ($\Delta E$) from at the time of observation under the D50 light source. As is the first embodiment, FIG. 3 represents the color constancy of BK ink in this embodiment, and FIG. 4 represents the color constancy when an achromatic color is printed using C, M and Y inks in combination. In characteristics of the Gy ink of FIG. 10, as compared with the C+M+Y ink of FIG. 4, $\Delta E$ is large when a light source is changed, and thus a light source dependence is high. Furthermore, the light source dependence of the BK ink shown in FIG. 3 is low as is the first embodiment.

Figure 11:
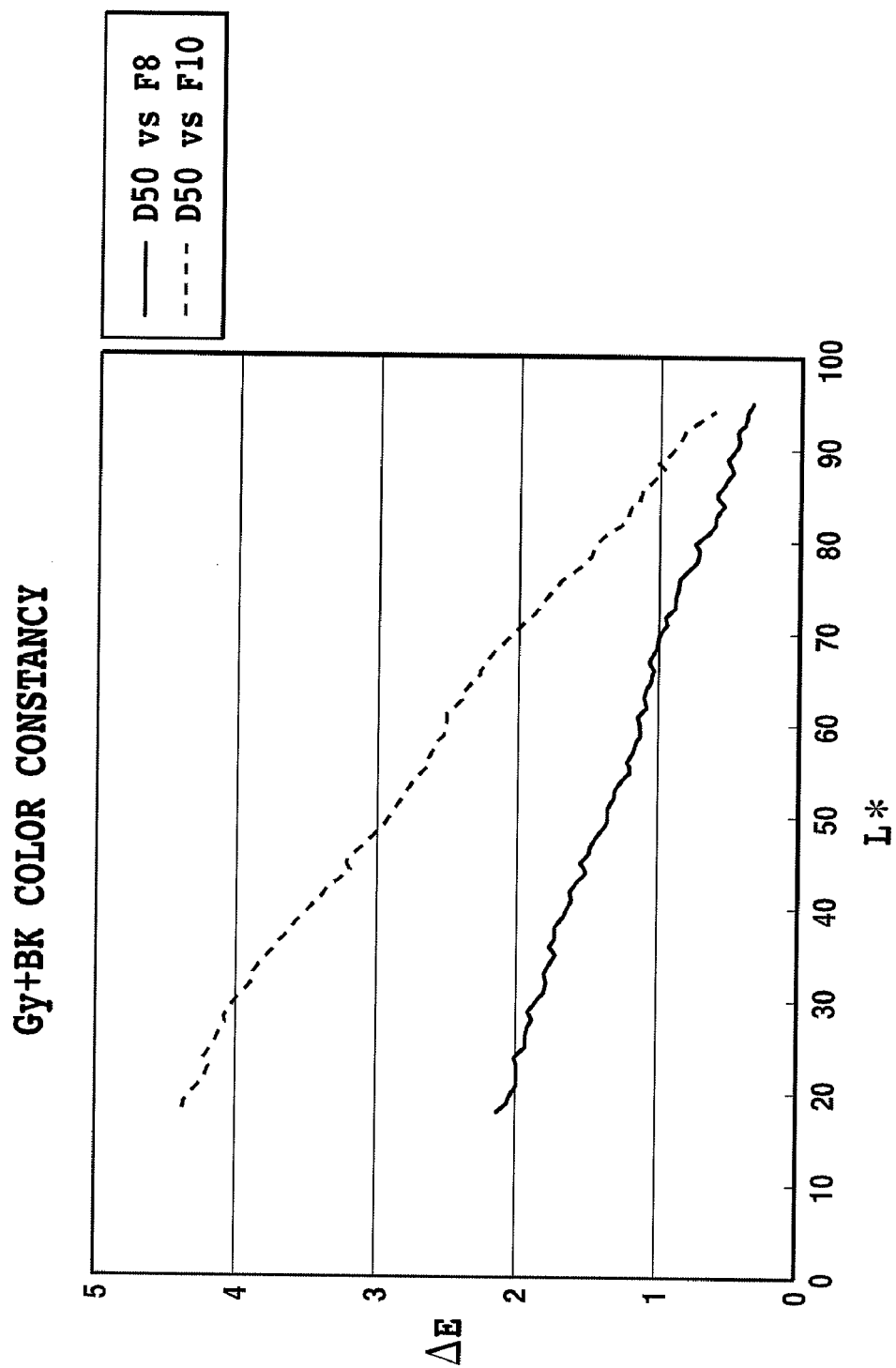
FIG. 11 is a chart showing a graph of color constancy at the time of the Gy ink and the BK ink in combination according to the second embodiment with D50 light source as a reference according to one embodiment of the present invention.

Here, when the patch to be a reference is created using an achromatic color material, a print is made using BK ink and Gy ink in combination. FIG. 11 is a graph of color constancy when printing using the Gy ink and the BK ink in combination in the ratio of 1:1. Although the shape is different from that of (C+M+Y) of FIG. 4, both in the case of FIG. 11 and in the case of FIG. 4, at the point of 50 L*, the similar light source dependence is given. By printing a density correction chart with the patch as a reference at the point L*50, even when the light source dependence of Gy is higher than that when CMY are mixed, a proper correction chart can be created. Thus, in this case, an achromatic color material of high light source dependence, to be used as a reference of correction not dependent on a light source, is to be a Gy ink and a BK ink in combination in the ratio of 1:1.

Furthermore, although in this embodiment, the Gy ink and the BK ink are used in the ratio of 1:1, the ratio is not limited thereto, but may be different depending on characteristics of C+M+Y. That is, as an achromatic color material of high light source dependence for use in correction not dependent on a light source, the ink with a spectrum close to that of the mixture of basic color materials (for example, C, M and Y inks) is preferably employed.

Other arrangements and processes are the same as those of the first embodiment, so that descriptions will be omitted.

Other Embodiments

The present invention is applicable to a system that is formed of a plurality of devices (for example, a computer, an interface device, a reader and a printer), or is applicable to an apparatus that is formed of one device (e.g., a multiple functional machine, a printer, and a facsimile device.

A processing method of storing, in a recording medium, an operating program of the above-described embodiments so as to implement functions of the above-described embodiments, and reading the program stored in this recording medium as a code and executing the program in a computer will also fall within the scope of the above-described embodiments. That is, a computer-readable recording medium is also included within the scope of the embodiments. Furthermore, the recording medium storing the above-described computer program, and additionally this computer program itself are also included in the above-described embodiments.

As such recording medium, for example, a floppy (trade mark) disk, a hard disk, an optical disk, a magneto optical disk, CD-ROM, a magnetic tape, a non-volatile memory card and ROM may be used.

Furthermore, not only the embodiment to execute processing based on the program that is stored in the above-described recording medium alone, but also the one to operate on OS and to execute operations of the above-described embodiments in cooperation with other software or the function of an expanded board will also fall within the scope of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-004628, filed Jan. 11, 2008, which is hereby incorporated by reference herein in its entirety.

What is claimed is:

1. An image processing device generating image data for image formation with an image forming unit which has a function of outputting a basic color material and outputting an achromatic color material of high light source dependence, wherein the achromatic color material of high light source dependence is manufactured by mixing basic color materials, and wherein with respect to the achromatic color material of high light source dependence, a difference between a first color measured under a first light source and a second color measured under a second light source different from the first light source is greater than a predetermined value, the image processing device comprising:
 a determination unit configured to determine an output density correction value of the basic color material using as a reference the achromatic color material of high light source dependence which is manufactured by mixing basic color materials; and
 a generation unit configured to generate the image data being by performing density correction using the determined output density correction value.

2. The image processing device according to claim 1, wherein the image forming unit further comprises a function of outputting an achromatic color material of low light source dependence, wherein with respect to the achromatic color material of low light source dependence, the difference between the first color measured under the first light source and the second color measured under the second light source different from the first light source is smaller than a predetermined value; wherein
 the image processing device further comprises a selection unit configured to select a correction dependent on a light source or a correction not dependent on a light source based on a user input; and wherein
 the determination unit determines the output density correction value of the basic color material with the achromatic color material of low light source dependence as a reference when the selection unit selects the correction dependent on the light source, and determines the output density correction value of the basic color material with the achromatic color material of high light source dependence as a reference when the selection unit selects the correction not dependent on the light source.

3. The image processing device according to claim 1, wherein the determination unit
 has a function of outputting a patch for selecting a balance of the basic color material when determining the output density correction value with the achromatic color material of high light source dependence as a reference, and
 extracts selection made based on the patch to determine the output density correction value according to the selection.

4. The image processing device according to claim 1, wherein the achromatic color material of high light source dependence has a light source dependence coincident with that when an achromatic color is reproduced using the basic color material.

5. The image processing device according to claim 1, wherein the basic color materials are cyan, magenta and yellow.

6. The image processing device according to claim 1, wherein the achromatic color material of high light source dependence is an achromatic color material with a spectrum close to that of a mixture of the basic color materials.

7. An image processing method generating image data for image formation with an image forming unit which has a function of outputting a basic color material and outputting an achromatic color material of high light source dependence, wherein the achromatic color material of high light source dependence is manufactured by mixing basic color materials, and wherein with respect to the achromatic color material of high light source dependence, a difference between a first color measured under a first light source and a second color measured under a second light source different from the first light source is greater than a predetermined value, the image processing method comprising the step of:
 determining an output density correction value of the basic color material using as a reference the achromatic color material of high light source dependence which is manufactured by mixing basic color materials,
 performing density correction using the determined output density correction value; and
 generating the image data by the density correction.

8. The image processing method according to claim 7, wherein the image forming unit further comprises a function of outputting an achromatic color material of low light source dependence, wherein with respect to the achromatic color material of low light source dependence, the difference between the first color measured under the first light source and the second color measured under the second light source different from the first light source is smaller than a predetermined value;
 wherein the image processing method further comprising the step of selecting a correction dependent on a light source or a correction not dependent on a light source based on a user input; and wherein
 the determining step determines the output density correction value of the basic color material with the achromatic color material of low light source dependence as a reference when in the selecting step, the correction dependent on the light source is selected, and determines the output density correction value of the basic color material with the achromatic color material of high light source dependence as a reference when in the selecting step, the correction not dependent on the light source is selected.

9. The image processing method according to claim 7, wherein the determination step includes a step of outputting a patch for selecting a balance of the basic color material when determining the output density correction value with the achromatic color material of high light source dependence as a reference, and
 extracts selection made based on the patch to determine the output density correction value according to the selection.

10. The image processing method according to claim 7, wherein the achromatic color material of high light source dependence has a light source dependence coincident with that when an achromatic color is reproduced using the basic color material.

11. The image processing method according to claim 7, wherein the basic color materials are cyan, magenta and yellow.

12. The image processing method according to claim 7, wherein the achromatic color material of high light source dependence is an achromatic color material which spectrum is close to that of a mixture of the basic color materials.

13. A non-transitory computer-readable storage medium having computer-executable instructions for performing a method, the method being an image processing method generating image data for image formation with an image forming unit which has a function of outputting a basic color material and outputting an achromatic color material of high light source dependence, wherein the achromatic color material of high light source dependence is manufactured by mixing basic color materials, and wherein with respect to the achromatic color material of high light source dependence, a difference between a first color measured under a first light source and a second color measured under a second light source different from the first light source is greater than a predetermined value, the method comprising the steps of:
  determining an output density correction value of the basic color material using as a reference the achromatic color material of high light source dependence which is manufactured by mixing basic color materials;
  performing density correction using the determined output density correction value; and
  generating the image data by the density correction.

* * * * *